United States Patent
Awasthi et al.

(10) Patent No.: US 9,021,204 B1
(45) Date of Patent: Apr. 28, 2015

(54) TECHNIQUES FOR MANAGING DATA STORAGE

(71) Applicant: Symantec Corporation, Mountain View, CA (US)

(72) Inventors: Nirendra Awasthi, Pune (IN); Sudhir Kumar, Pune (IN)

(73) Assignee: Symantec Corporation, Mountain View, CA (US)

( * ) Notice: Subject to any disclaimer, the term of this patent is extended or adjusted under 35 U.S.C. 154(b) by 260 days.

(21) Appl. No.: 13/779,453

(22) Filed: Feb. 27, 2013

(51) Int. Cl.
G06F 12/00 (2006.01)
G06F 3/00 (2006.01)
G06F 3/06 (2006.01)
G06F 12/08 (2006.01)

(52) U.S. Cl.
CPC .......... *G06F 3/0653* (2013.01); *G06F 12/0866* (2013.01); *G06F 12/08* (2013.01)

(58) Field of Classification Search
None
See application file for complete search history.

(56) References Cited

U.S. PATENT DOCUMENTS

| | | | | |
|---|---|---|---|---|
| 7,155,593 B2 * | 12/2006 | Kano | ............................ | 711/165 |
| 8,315,995 B1 * | 11/2012 | Levy | ............................ | 707/694 |
| 2007/0239803 A1 * | 10/2007 | Mimatsu | ....................... | 707/204 |

* cited by examiner

*Primary Examiner* — Matthew Bradley
*Assistant Examiner* — Craig Goldschmidt
(74) *Attorney, Agent, or Firm* — Wilmer Cutler Pickering Hale and Dorr LLP

(57) ABSTRACT

Techniques for managing data storage within storage tiers are disclosed. In one particular embodiment, the techniques may be realized as a method for managing data storage having the steps of assigning a storage class for each of a plurality of storage tiers, defining at least one rule for storing data in the plurality of storage tiers, determining whether performance assisted tier migration is requested, monitoring the plurality of storage tiers when it is determined that the performance assisted tier migration is requested, determining whether to redefine the storage class of one of the plurality of storage tiers based on the monitoring, and determining whether to migrate the data based on the monitoring.

18 Claims, 4 Drawing Sheets

TECHNIQUES FOR MANAGING DATA STORAGE

FIELD OF THE DISCLOSURE

The present disclosure relates generally to storing data and, more particularly, to techniques for managing data storage within storage tiers.

BACKGROUND OF THE DISCLOSURE

Large volumes of data may be stored in a multi-tier environment and a service level agreement (SLA) may require that the data be highly available or have a high level of performance. For example, the data may be stored within a tier of the multi-tier environment that has a high level of performance based on data criticality. However, traditional data storage management technologies may simply statically store the data in the specified tier even though the cost to store the data in this tier may be high, the performance of disks within this tier may vary over time causing problems with availability of the data, and the criticality of the data stored in this tier may vary over time. Further, data may be stored in a high expensive tier without measuring actual performance of the tier in traditional data storage management techniques.

In view of the foregoing, it may be understood that there may be significant problems and shortcomings associated with traditional data storage management technologies.

SUMMARY OF THE DISCLOSURE

Techniques for managing data storage within storage tiers are disclosed. In one particular embodiment, a method for managing data storage may comprise the steps of: assigning a storage class for each of a plurality of storage tiers; defining at least one rule for storing data in the plurality of storage tiers; determining whether performance assisted tier migration is requested; monitoring the plurality of storage tiers when it is determined that the performance assisted tier migration is requested; determining whether to redefine the storage class of one of the plurality of storage tiers based on the monitoring; and determining whether to migrate the data based on the monitoring.

In accordance with other aspects of this particular embodiment, each of the plurality of storage tiers comprise at least one of a physical storage device and a virtual storage device.

In accordance with other aspects of this particular embodiment, determining whether to migrate the data is based on the redefined storage classes.

In accordance with other aspects of this particular embodiment, the storage class for each of the plurality of storage tiers is assigned by a user.

In accordance with other aspects of this particular embodiment, the storage class specifies a performance ranking of the associated storage tier.

In accordance with other aspects of this particular embodiment, the at least one rule is based on criticality of the data stored.

In accordance with other aspects of this particular embodiment, the at least one rule is based on an availability requirement of the data stored or a performance requirement of the data stored.

In accordance with other aspects of this particular embodiment, the request for performance tier migration is input by a user.

In accordance with further aspects of this particular embodiment, the method may further comprise determining whether to automatically migrate data or to notify the user based on the user input.

In accordance with other aspects of this particular embodiment, determining whether to migrate the data is based on at least one attribute of the plurality of storage tiers.

In accordance with other aspects of this particular embodiment, the attributes include at least one of I/O latency, throughput, and I/O errors.

In accordance with other aspects of this particular embodiment, monitoring the plurality of storage tiers is based on the attributes.

In accordance with further aspects of this particular embodiment, monitoring the plurality of storage tiers includes determining whether the monitored attribute exceed a first threshold.

In accordance with further aspects of this particular embodiment, the method may further comprise redefining the one of the plurality of storage tiers as a lower storage class when the monitored attribute fall below the first threshold.

In accordance with other aspects of this particular embodiment, monitoring the plurality of storage tiers includes determining whether the monitored attribute exceed a second threshold.

In accordance with further aspects of this particular embodiment, the method may further comprise redefining the one of the plurality of storage tiers as a higher storage class when the monitored attribute exceeds the second threshold.

In accordance with further aspects of this particular embodiment, monitoring the plurality of storage tiers includes comparing the monitored attribute of a first tier to a second tier.

In accordance with further aspects of this particular embodiment, the method may further comprise redefining the first tier as a higher storage class and the second tier as a lower storage class when the monitored attribute of the first tier exceeds the monitored attribute of the second tier.

In another particular embodiment, the techniques may be realized as least one non-transitory processor readable storage medium storing a computer program of instructions configured to be readable by at least one processor for instructing the at least one processor to execute a computer process for performing the method for managing data storage may comprise the steps of: assigning a storage class for each of a plurality of storage tiers; defining at least one rule for storing data in the plurality of storage tiers; determining whether performance assisted tier migration is requested; monitoring the plurality of storage tiers when it is determined that the performance assisted tier migration is requested; determining whether to redefine the storage class of one of the plurality of storage tiers based on the monitoring; and determining whether to migrate the data based on the monitoring.

In another particular embodiment, the techniques may be realized as a system for managing data storage comprising: one or more processors communicatively coupled to a network; wherein the one or more processors are configured to: assign a storage class for each of a plurality of storage tiers; define at least one rule for storing data in the plurality of storage tiers; determine whether performance assisted tier migration is requested; monitor the plurality of storage tiers when it is determined that the performance assisted tier migration is requested; determine whether to redefine the storage class of one of the plurality of storage tiers based on the monitoring; and determine whether to migrate the data based on the monitoring.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
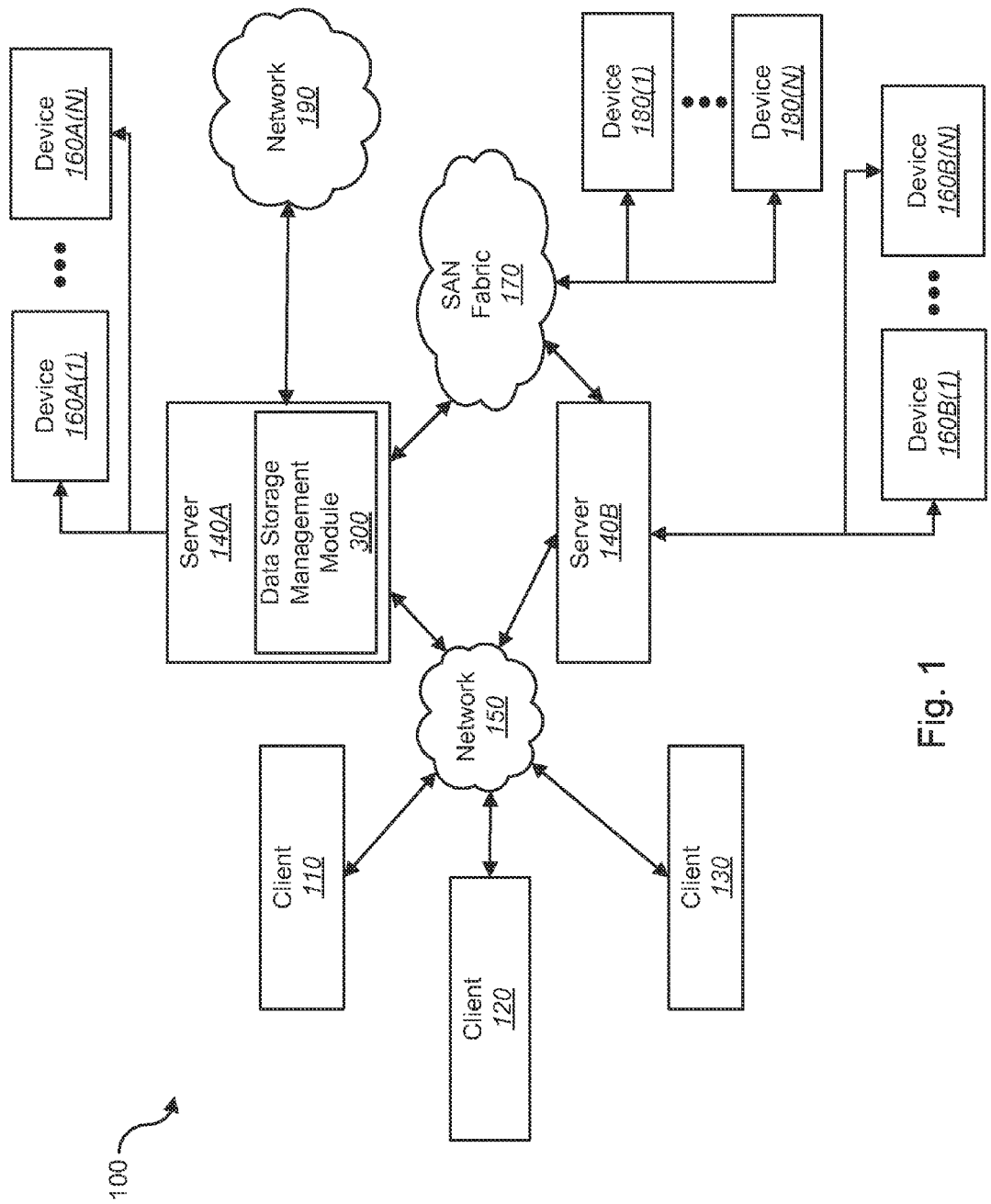
FIG. 1 shows a block diagram depicting a network architecture in accordance with an embodiment of the present disclosure.

FIG. 1 shows a block diagram depicting a network architecture for managing data storage multi-tier environment in accordance with an embodiment of the present disclosure. FIG. 1 is a simplified view of network architecture 100, which may include additional elements that are not depicted. Network architecture 100 may contain client systems 110, 120 and 130, as well as servers 140A-140N (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., data storage management module 300 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
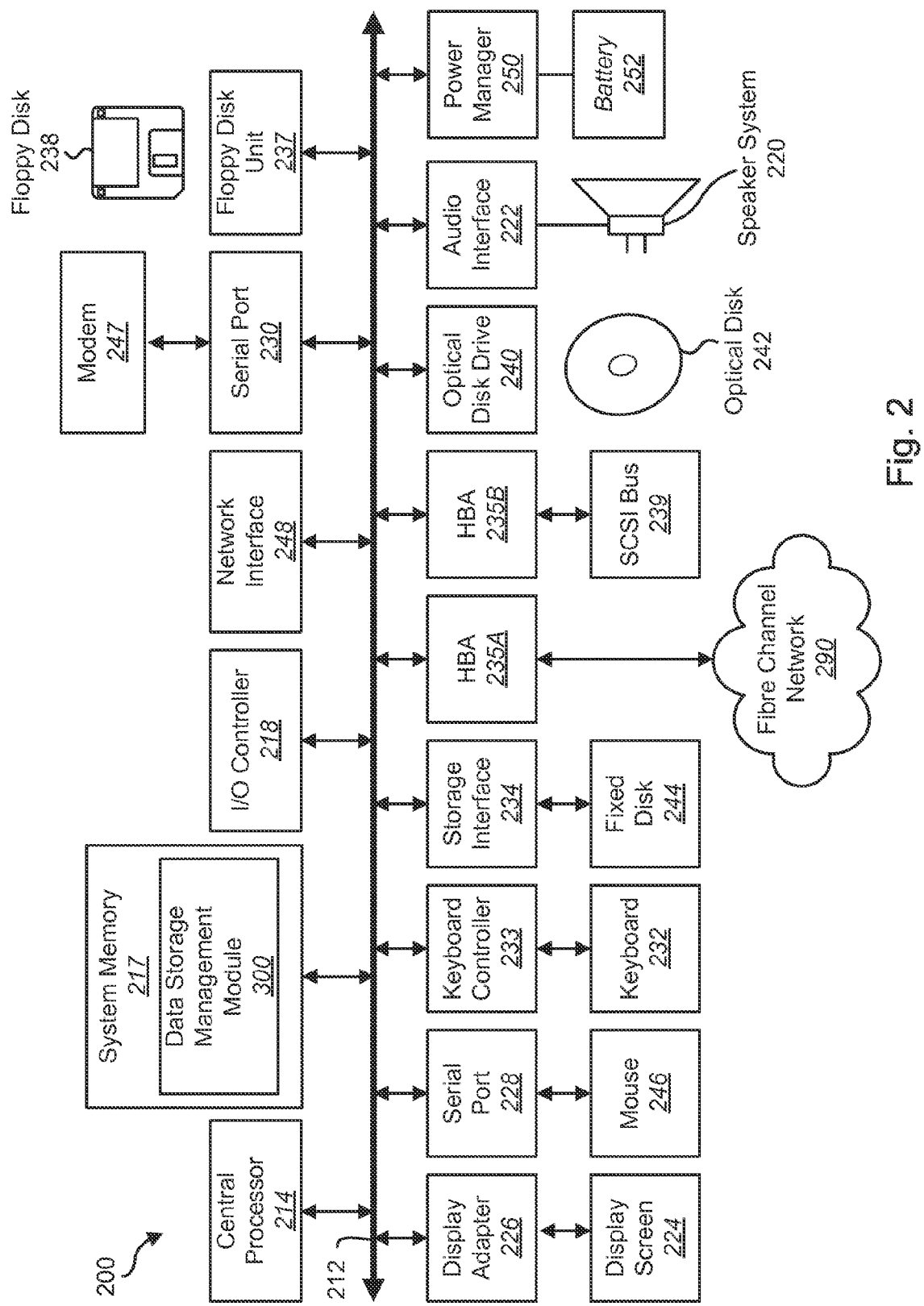
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes. Further, storage devices 160A(1)-(N), 160B(1)-(N), and/or 180(1)-(N) may be implemented as part of a multi-tier storage environment.

According to some embodiments, clients 110, 120, and 130 may be smartphones, PDAs, desktop computers, laptop computers, servers, other computers or computing devices, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. In some embodiments, server 140A may be a host that manages storage of data, including application data, in a multi-tiered environment. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, servers 140A and 140B may contain one or more portions of software for data storage management such as, for example, data storage management module 300. Further, one or more portions of the data storage management module 300 may reside at a network centric location. For example, server 140A may be a server, a firewall, a gateway, or other network element that may perform one or more actions to support data storage management. According to some embodiments, network 190 may be an external network (e.g., the Internet) and server 140A may be a gateway or firewall between one or more internal components and clients and the external network. According to some embodiments, data storage management module 300 may be implemented as part of a cloud computing environment.

FIG. 2 shows a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, a removable disk unit (e.g., Universal Serial Bus drive), or other storage medium. According to some embodiments, data storage management module 300 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptible Power Supply (UPS) located either local to or remote from computer system 200. In such embodiments, power manager 250 may provide information about a power level of an UPS.

Figure 3:
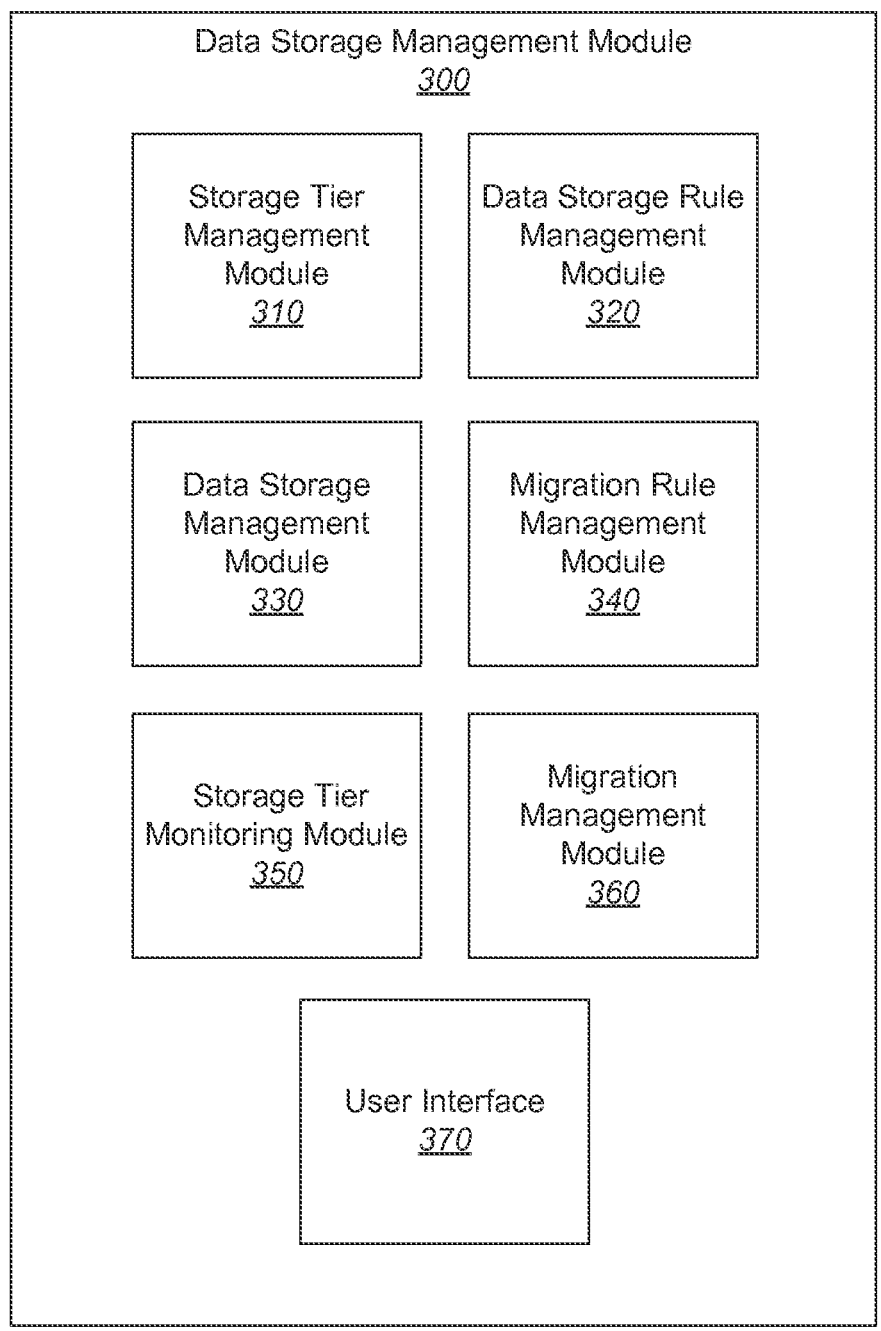
FIG. 3 shows a data storage management module in accordance with an embodiment of the present disclosure.

FIG. 3 shows a data storage management module 300 in accordance with an embodiment of the present disclosure. As illustrated, the data storage management module 300 may contain one or more components including a storage tier management module 310, a data storage rule management module 320, a data storage management module 330, a migration rule management module 340, a storage tier monitoring module 350, a migration management module 360, and a user interface 370.

The storage tier management module 310 may manage different tiers of storage within a multi-tier storage environment. In some embodiments, each tier may include at least one physical or virtual volume in a multi-node storage environment. In addition, a user or administrator may identify how each of the volumes are to be tagged and arranged within the tiers. For example, the storage tier management module 310 may tag a first plurality of volumes to be within a first tier that have a high performance level and a high cost. In one embodiment, the first tier may be comprised of a plurality of solid state drives (SSD). In addition, the storage tier management module 310 may tag a second plurality of volumes to be within a second tier that have a moderate performance level and a moderate cost. In one example, the second plurality of volumes may be a high end storage array that has a lower performance and cost than the solid state drives within the first tier. Additionally, the storage tier management module 310 may tag a third plurality of volumes to be within a third tier that have a low performance level and a low cost. Furthermore, the storage tier management module 310 may manage any number of physical and virtual volumes within a plurality of tiers having different performance attributes.

The data storage rule management module 320 may manage rules defining which tier data is to be stored within. In some embodiments, the rules managed by the data storage rule management module 320 may be input by a user or administrator and correspond to the criticality, the level of availability, or a performance requirement of the associated data. For example, a service level agreement (SLA) may require that a certain application be highly available and accordingly the data supporting that application must be arranged within a storage tier that is very stable. In another embodiment, the data to be stored may be data that is to be frequently accessed but must also be accessible with a low amount of I/O latency and I/O errors. Accordingly, this data may need to be arranged within a storage tier that has a high level of performance, low I/O latency, and low I/O errors. Additionally, data that is not accessed frequently or has low criticality may be defined as data to be stored in a low level tier that has a lower associated cost. The data storage rule management module 320 may manage any number of rules for data in the tiers based on any combination of performance attributes.

The data storage management module 330 may store data within the storage tiers managed by the storage tier management module 310 according to the rules managed by the data storage rule management module 320. In some embodiments, the data storage management module 330 may initially store critical data in volumes tagged as part of a first storage tier having a high performance level, low I/O latency, low I/O errors, and a high cost. In addition, the data storage management module 330 may initially store noncritical data in volumes tagged as part of a further storage tier having a low error rate, a low I/O performance level, and a low cost. For example, the data storage management module 330 may store the critical data on a plurality of solid state drives in the first storage tier and the noncritical data on a plurality of magnetic tapes in the further storage tier.

Additionally, the data storage management module 330 may determine whether an assisted tier migration has been requested. For example, the data storage management module 330 may determine that a user has requested assisted tier migration such that the performance of the volumes within the storage tiers may be monitored and the data may be migrated when there is a change in performance of the volumes. Additionally, the data storage management module 330 may determine that a user has not requested assisted tier migration such that the performance of the volumes within the storage tiers is not monitored and the data is stored according to the defined rules.

The migration rule management module 340 may manage migration rules when the assisted tier migration has been requested. For example, the migration rule management module 340 may manage which attributes of the volumes and the storage tiers are to be monitored. For example, a user may specify I/O latency, I/O errors, and throughput as attributes of the volumes to be monitored. Accordingly, migration of the data stored within the tiers may be based on these monitored attributes.

Additionally, the migration rules managed by the migration rule management module 340 may specify the action to be performed when it is determined that the data is no longer being stored in the storage tiers according to the defined rules. For example, a user may specify that the data is to be automatically migrated to an appropriate volume within an appropriate storage tier. Alternatively, a user may specify that when it is determined that the data is no longer being stored in accordance with the defined rules due to a change in an attribute of a volume, the user may be notified to take appropriate action.

The storage tier monitoring module 350 may monitor the attributes of the volumes within the storage tiers managed by the migration rule management module 340 when the assisted tier migration has been requested. For example, the storage tier monitoring module 350 may monitor the volumes in each of the tiers for I/O latency, I/O errors, and throughput. In some embodiments, the storage tier monitoring module 350 may monitor the specified attributes of each of the volumes in each of the storage tiers on a regular or periodic basis, or when data is read from or written to the volume.

The migration management module 360 may determine whether the data initially stored in the volumes by the data storage management module 330 is to be migrated based on the monitoring of the volume attributes by the storage tier monitoring module 350. In some embodiments, the migration management module 360 may compare the results of the monitoring of the volumes from the storage tier monitoring module 350 with the requirements for the storage tiers. For example, the migration management module 360 may determine that a volume in a first (i.e., gold) tier has an I/O latency that exceeds a threshold. Accordingly, the migration management module 360 may determine which appropriate action to take by for example, automatically retagging the volume to be within a different tier and migrating the data on that volume or notifying the user or administrator. Additionally, the migration management module 360 may determine that a performance of a volume in a lower tier satisfies the requirements of a higher tier and accordingly that volume can be retagged and the data stored thereon may be migrated.

The user interface 370 may interact with each of the above-noted modules to receive information from and provide information to a user or administrator. For example, the user interface 370 may receive from how each of the volumes are to be tagged and arranged within the storage tiers. In addition, the user interface 370 may receive information from a user indicating how the data is to be stored within the tiers. Additionally, the user interface 370 may present the user with an option for assisted data migration and may display notifications indicating that a volume is no longer satisfying the requirements for a certain tier. Furthermore, the user interface 370 may display any additional information that may be relevant to the data storage and migration.

Figure 4:
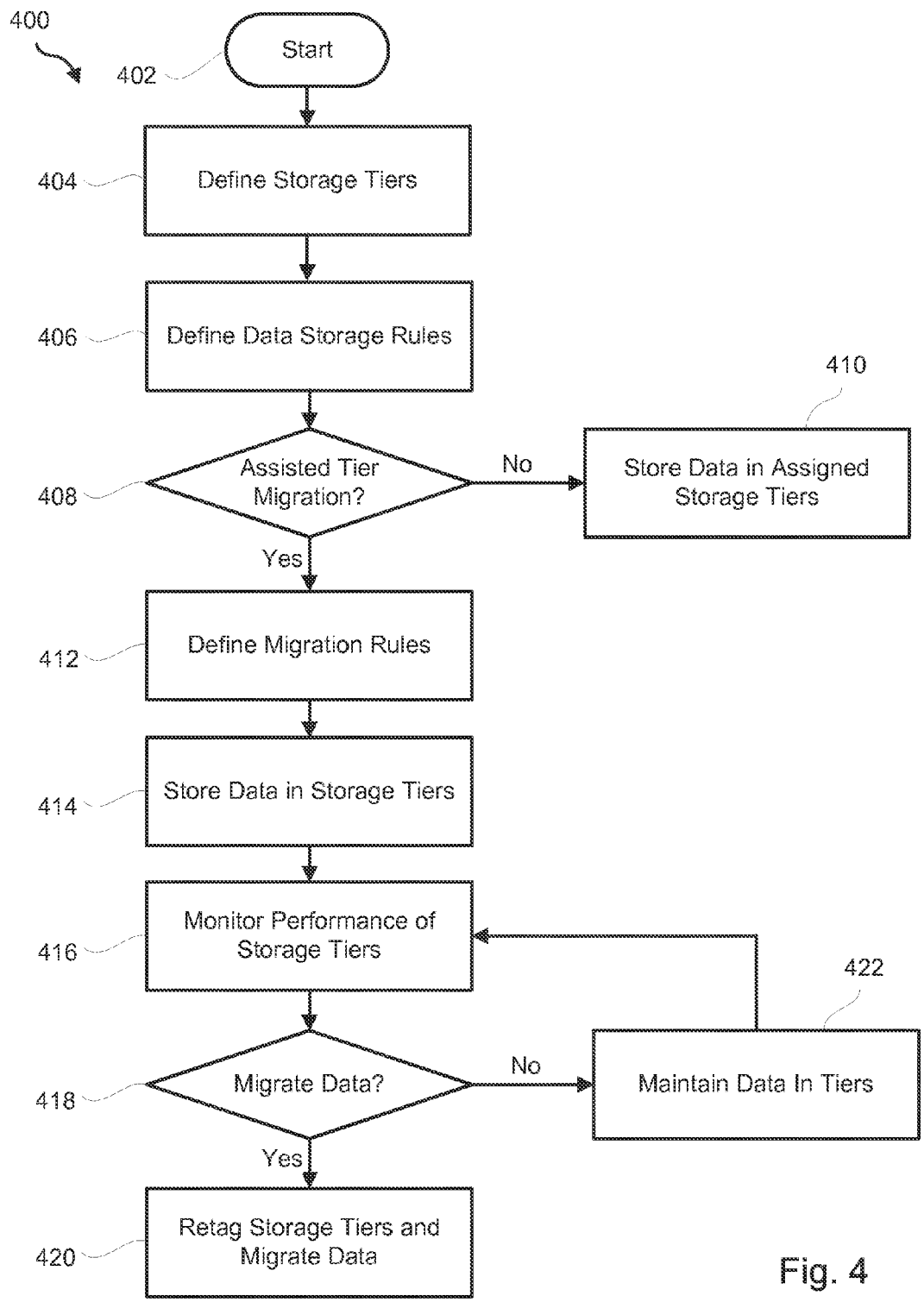
FIG. 4 shows a method for managing data storage within a multi-tiered environment in accordance with an embodiment of the present disclosure.

FIG. 4 shows a method 400 for method for managing data storage in a multi-tiered environment in accordance with an embodiment of the present disclosure. At block 402, the method 400 may begin.

At block 404, various storage tiers within a multi-tier storage environment may be defined according to the type of storage available within each tier and the performance attributes of the associated storage. In some embodiments, the storage tier management module 310 may define the storage tiers. The multi-tiered storage environment may include multiple tiers that each include various types of physical storage devices and/or virtual storage devices. For example, a first tier may include multiple physical solid state drives, a second tier may include a high speed physical storage array, a third tier may include a physical storage array of a lower speed, a fourth tier of optical disks, and a fifth tier of magnetic tape drives. Additionally, the tiers may be virtual storage devices implemented as part of a storage area network. In some embodiments, the virtual storage devices may be defined according to the performance characteristics of the underlying physical storage units across multiple devices. Further, the multi-tier storage environment may include a combination of physical storage tiers and virtual storage tiers within a multi-node computing environment.

In some embodiments, a user or administrator may define the various storage tiers and tag volumes within the storage environment to be within a particular tier. In addition, the user or administrator may specify the various storage tiers to be implemented as part of the multi-tier storage environment via the user interface 370. For example, a first tier having a high level of performance and cost may be defined as a gold tier, a second tier having a lower level of performance and a lower cost may be defined as a silver tier, and a third tier having an even lower level of performance and cost may be defined as a bronze tier. After the storage tiers have been defined, the process may then proceed to block 406.

At block 406, rules for storing data in the various tiers may be defined. In some embodiments, the data storage rule management module 320 may manage the data storage rules input by a user or administrator. Additionally, the data storage rules may be based on criticality of the data or a performance requirement. For example, the data storage rules may specify that first data having a first classification is to be stored in a first high level tier since the first data has a high criticality requirement. In one example, the first data may be an application which must be highly available according to the Service Level Agreement (SLA).

In addition, the data storage rules may specify that second data having a second classification is to be stored in a moderate level tier since the second data has a moderate criticality requirement and that third data having a third classification is to be stored in a low level tier since the third data has a low criticality requirement. For example, the second data may be data that is occasionally accessed and the third data may be back up data that is rarely accessed. In some embodiments, a user or administrator may define the data storage rules via the user interface 370. Additionally, the user or administrator may modify or change the data stored rules at any time. After the data storage rules have been defined, the process may proceed to block 408.

At block 408, it may be determined whether a performance assisted tier migration has been requested. In some embodiments, the data storage management module 330 may determine whether the performance assisted tier migration has been requested by a user or administrator. Additionally, the user interface 370 may present the user or administrator with an option to specify whether the performance assisted tier migration is requested. When it is determined that the assisted tier migration is not requested, the process may proceed to block 410.

At block 410, the data may be stored in the storage tiers defined at block 404 according to the data storage rules defined at block 406. In some embodiments, the data storage management module 330 may store the data in the various storage tiers according to the data storage rules defined at block 406. The process may then proceed back to block 408 to determine whether the assisted tier migration has been requested.

When it is determined that the assisted tier migration has been requested at block 408, the process may proceed to block 412. At block 412, migration rules may be defined. In some embodiments, the migration rule management module 340 may manage the migration rules that include storage tier attributes and whether to automatically migrate data. Additionally, the migration rules may be defined by a user or an administrator via the user interface 370. For example, the user or administrator may identify particular attributes of the volume within the storage tiers for the migration to be based on. The attributes of the storage tiers may include I/O latency, throughput, I/O errors, and any other performance attribute. In addition, the user or administrator may specify whether the data is to be automatically migrated without user input to the appropriate storage tier or to alert the user or the administrator without migrating the data. After the migration rules have been defined at block 412, the process may proceed to block 414.

At block 414, the data may be initially stored in the various storage tiers defined at block 404 according to the data storage rules defined at block 406. In some embodiments, the data storage management module 330 may store the data in the various storage tiers. For example, the data storage management module 330 may store critical data in a first tier having a high performance level and data having a low criticality in a third tier with a low performance level. After the data has been initially stored in the storage tiers at block 414, the process may proceed to block 416.

At block 416, the attributes of the storage tiers defined at block 412 (i.e., performance and I/O errors) may be monitored. In some embodiments, the storage tier monitoring module 350 may monitor the storage tiers. For example, I/O errors for the discs, volumes, and the file system of the storage tiers may be monitored. The performance of the storage tiers may be monitored continuously or periodically. In addition, performance of applications running on the stored tiers may be monitored. The process may then proceed to block 418.

At block 418, it may be determined whether to migrate the data in the storage tiers. In some embodiments, the migration management module 360 may determine whether the data initially stored in the storage tiers at block 414 is to be migrated to a different storage tier. For example, data may need to be migrated if it is determined that an I/O latency for volume A in a first storage tier (i.e., gold) is greater than an I/O latency of volume B in a second storage tier (i.e., silver) where the first storage tier is supposed to have a higher performance than the second tier. In this example, it may be determined that volume A should be retagged to be within the second storage tier (i.e., silver) and volume B should be retagged to be within the first storage tier (i.e., gold). Accordingly, it may be determined that the data stored in volume A is to be migrated to volume B and the data stored in volume B is to be migrated to volume A to satisfy the specified data storage rules.

Additionally, application data may need to be migrated if it is determined that the performance of an application running on the second storage tier (i.e., silver) falls below a threshold specified by a service level agreement (SLA). In this instance, the data supporting the application may be migrated from the second storage tier (i.e., silver) to the first storage tier (i.e., gold). Further, if the performance of an application running on a third tier (i.e., bronze) falls below an acceptable threshold according to the SLA, the application data may be moved to the first tier (i.e., gold) or second tier (i.e., silver). However, if it is determined that the data does not need to be migrated, the process may proceed to block 422.

At block 422, the data previously stored in the storage tiers at block 414 may be maintained in its current location and the process may proceed to block 416. At block 416, the performance of the storage tiers may again be monitored.

If at block 418, it is determined that the data is to be migrated, a process may proceed to block 420. At block 420, the volumes within the storage tiers may be retagged based on the performance of the storage tiers monitored at block 416. In some embodiments, the migration management module 360 may retag the volume and migrate the data. For example, volume A may be retagged to be within the second storage tier (i.e., silver) and volume B may retagged to be within the first storage tier (i.e., gold). In addition, the data previously stored on volume A and volume B may be migrated to the appropriate storage tier according to the data storage rules defined at block 406. In one example, the data previously stored on volume A may be highly critical data such that when volume A is retagged to be within a tier that is not appropriate for the data, the data may be migrated automatically to a different volume that is still within the first tier or may be migrated to volume B which was retagged to be within the first tier. In other embodiments, a user or administrator may be notified of an alert that the data is to be migrated to the appropriate tier or that the data is no longer being stored in an appropriate tier and needs to be migrated. After the data has been migrated to the appropriate tier or the user has been notified, the process may proceed back to block 416.

At this point it should be noted that managing data storage in accordance with the present disclosure as described above may involve the processing of input data and the generation of output data to some extent. This input data processing and output data generation may be implemented in hardware or software. For example, specific electronic components may be employed in managing data storage or similar or related circuitry for implementing the functions associated with managing data storage in accordance with the present disclosure as described above. Alternatively, one or more processors operating in accordance with instructions may implement the functions associated with managing data storage in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for managing data storage comprising the steps of:
   defining a plurality of storage tiers, wherein the plurality of storage tiers are ranked from a highest to a lowest level in a storage hierarchy;
   defining at least one rule for storing data in the plurality of storage tiers;
   determining whether performance assisted tier migration is requested;
   monitoring at least one attribute of each of the plurality of storage tiers when it is determined that the performance assisted tier migration is requested;
   determining whether to redefine at least one of the plurality of storage tiers based on the monitoring; and
   determining whether to migrate the data based on the monitoring;
   wherein if a first tier is ranked at a lower level than a second tier, and a monitored attribute of the first tier exceeds a corresponding monitored attribute of the second tier, redefining the first tier as a higher level and redefining the second tier as a lower level.

2. The method of claim 1, wherein each of the plurality of storage tiers comprises at least one of a physical storage device and a virtual storage device.

3. The method of claim 1, wherein determining whether to migrate the data is based on redefined storage tiers.

4. The method of claim 1, wherein the storage level for each of the plurality of storage tiers is assigned by a user.

5. The method of claim 1, wherein the storage level specifies a performance ranking of the associated storage tier.

6. The method of claim 1, wherein the at least one rule is based on criticality of the data stored.

7. The method of claim 1, wherein the at least one rule is based on an availability requirement of the data stored or a performance requirement of the data stored.

8. The method of claim 1, wherein the request for performance assisted tier migration is input by a user.

9. The method of claim 8, further comprising:
   determining whether to automatically migrate data or to notify the user based on the user input.

10. The method of claim 1, wherein determining whether to migrate the data is based on at least one attribute relating to performance of the plurality of storage tiers.

11. The method of claim 10, wherein the at least one attribute includes at least one of I/O latency, throughput, and I/O errors.

12. The method of claim 1, wherein monitoring at least one attribute of each of the plurality of storage tiers includes determining whether the monitored attribute exceeds a first threshold.

13. The method of claim 12, further comprising:
   redefining the at least one of the plurality of storage tiers as a lower storage level when the monitored attribute falls below the first threshold.

14. The method of claim 1, wherein monitoring at least one attribute of each of the plurality of storage tiers includes determining whether the monitored attribute exceeds a second threshold.

15. The method of claim 14, further comprising:
   redefining the at least one of the plurality of storage tiers as a higher storage level when the monitored attribute exceeds the second threshold.

16. The method of claim 14, wherein monitoring at least one attribute of each of the plurality of storage tiers includes comparing the monitored attribute of a first tier to a second tier.

17. At least one non-transitory processor readable storage medium storing a computer program of instructions configured to be readable by at least one processor for instructing the at least one processor to execute a computer process for performing the method as recited in claim 1.

18. A system for managing data storage comprising:
   one or more processors communicatively coupled to a network; wherein the one or more processors are configured to:
      defining a plurality of storage tiers, wherein the plurality of storage tiers are ranked from a highest to a lowest level in a storage hierarchy;
      define at least one rule for storing data in the plurality of storage tiers;
      determine whether performance assisted tier migration is requested;
      monitor at least one attribute of each of the plurality of storage tiers when it is determined that the performance assisted tier migration is requested;
      determine whether to redefine at least one of the plurality of storage tiers based on the monitoring; and
      determine whether to migrate the data based on the monitoring;
      wherein if a first tier is ranked at a lower level than a second tier, and a monitored attribute of the first tier exceeds a corresponding monitored attribute of the second tier, redefining the first tier as a higher level and redefining the second tier as a lower level.

* * * * *